United States Patent [19]
McDermott

[11] Patent Number: 6,091,238
[45] Date of Patent: Jul. 18, 2000

[54] VARIABLE OUTPUT ELECTRICAL DEVICE

[75] Inventor: Damien McDermott, Hampstead, Md.

[73] Assignee: Kevin McDermott, Hampstead, Md.

[21] Appl. No.: 08/928,166

[22] Filed: Sep. 12, 1997

Related U.S. Application Data

[63] Continuation of application No. 08/493,690, Jun. 22, 1995.

[51] Int. Cl.[7] .................................................. G01B 7/14
[52] U.S. Cl. ................................ 324/207.2; 324/207.26; 340/686; 315/307; 323/905; 335/205
[58] Field of Search ........................... 324/207.2–207.26, 324/202, 251, 260, 117 H, 133; 338/32 H; 307/116; 340/540, 686; 362/236; 315/200 A, 224, 149, 307, 362; 335/205; 257/414, 421, 427; 323/905

[56] References Cited

U.S. PATENT DOCUMENTS

| | | | |
|---|---|---|---|
| 3,317,829 | 5/1967 | Kuhrt et al. | 324/207.2 |
| 4,061,988 | 12/1977 | Lewandowski | 338/32 H |
| 4,107,604 | 8/1978 | Bernier | 324/207.2 |
| 4,506,218 | 3/1985 | Brown et al. | 324/117 H |
| 4,728,928 | 3/1988 | Shipley | 338/32 H |
| 5,003,363 | 3/1991 | Lachmann | 324/207.2 |
| 5,264,792 | 11/1993 | Luetzow et al. | 324/207.2 |
| 5,414,355 | 5/1995 | Davidson et al. | 324/207.2 |
| 5,814,725 | 9/1998 | Furuichi et al. | 73/146.5 |

FOREIGN PATENT DOCUMENTS

| | | | |
|---|---|---|---|
| 2108678 | 5/1983 | United Kingdom | 324/207.2 |
| 2272060 | 5/1994 | United Kingdom | 324/207.2 |

*Primary Examiner*—Jay Patidar
*Attorney, Agent, or Firm*—McAuley Nissen Goldberg Kiel & Hand, LLP

[57] ABSTRACT

The present invention incorporates a system for varying the output signal and regulating the power consumed by an electrical device. It achieves its purpose by moving a magnet relative to a Hall effect sensor which is responsive to an intersecting magnetic field. The Hall effect sensor creates an electrical output signal which determines the input signal of an output element of the device. The electrical Hall effect sensor signal thereby controls the output signal emitted by the electrical output element. The magnet is moved using a movable element. Since the location and movement of the magnet regulates the Hall effect sensor output signal, the output signal of the electrical device as well as its rate of change are regulated using the movable element. In order to conserve power the Hall effect sensor element is usually not energized when the device is in the "off" mode. However a switching means correlated with the position of the movable element energizes the Hall effect sensor when the magnet has created a magnetic field of acceptable density and direction.

55 Claims, 5 Drawing Sheets

VARIABLE OUTPUT ELECTRICAL DEVICE

This is a continuation of application Ser. No. 08/493,690, filed on Jun. 22, 1995.

BACKGROUND OF THE INVENTION

1. Field of the Invention

The present invention relates to an electrical device in general and a signal device in particular. The invention permits the user to control the power supplied to and the signal emitted by an output component of the device such as a signal lamp by translating or rotating a movable element. A threaded cover or base of the housing of the device is easily employed as the movable element.

Description of Prior Art

Prior art incorporates a high current potentiometer to regulate the power supplied to an electrical output element. The high current potentiometer is a variable resistor which is connected in series with the electrical output element. The resistance of the potentiometer is adjusted by rotating the knob of the potentiometer. It is a design which is lacking in several areas.

First the potentiometer is prone to failure as its moving parts wear. Second, the potentiometer has a control knob which must penetrate the body of the electrical device and in so doing reduces the strength of the case. For electrical devices which must be watertight, the opening in the body for the control knob can also be a source of leakage. Third, the projecting control knob is vulnerable to breakage. Fourth, the potentiometer must handle all the electrical current of the electrical device and therefore it is expensive. Fifth, the potentiometer is electrically connected to the source of power it therefore creates a safety hazard.

Another prior art design incorporates a metal oxide semiconductor field effect transistor (MOSFET) with its source and drain terminals in series with an electrical output element such as a high wattage incandescent lamp. The gate voltage of the MOSFET is controlled by a low current potentiometer. The MOSFET is a variable resistor which changes the resistance between its source and drain terminals in response to an applied gate voltage. Since the potentiometer only regulates the gate voltage it is only required to control a very small amount of power. The MOSFET handles the larger power necessary to control the high wattage lamp. This design reduces the power controlled by the potentiometer and improves the reliability of the electrical device. However, it does not eliminate many of the previously described problems associated with the high current potentiometer design. The design can work acceptably well if due consideration is given to the design of the low current potentiometer and its interaction with the gate control circuit of the MOSFET. An acceptable limited rotation of the knob on the potentiometer must effect the change in gate voltage required by the MOSFET to alter its resistance sufficiently for the lamp to have its intensity sufficiently altered. If a small rotation of the potentiometer knob creates too large a change in gate voltage the lamp will change from "DIM" to "BRIGHT" too quickly and the user will not be able to adjust to the precise intensity needed. On the other hand, if complete rotation of the potentiometer knob does not affect an adequate change in gate voltage, the resistance of the MOSFET will remain high and the lamp will not achieve full intensity. Potentiometers can be designed to provide almost any range of resistance values and can therefore usually be designed to permit adjustment of the gate voltage within the required range. The MOSFET must also include an acceptable range of resistance. Since the MOSFET is in series with the lamp, its resistance at its low resistance value must be low enough relative to the lamps resistance to permit the lamp to become to be acceptably "BRIGHT" and its resistance at its high resistance value must be large enough relative to the lamps resistance to assure that the lamp becomes acceptably "DIM". Unfortunately, there are only a limited number of MOSFETs from which to choose each with different initial and final resistance values. Therefore, there is no assurance that an acceptable MOSFET is available for a particular lamp. Also each MOSFET changes its resistance at a rate of change which is related to the rate of change of its gate voltage. Therefore, the operator must have the ability to change the gate voltage at a rate of change that correlates with the required rate of change of the resistance of the MOSFET and in turn the required rate of change of the intensity of the lamp. Some embodiments require a linear change in gate voltage and for these the potentiometer can function very well. However, other embodiments require a non-linear change in gate voltage. In this regard, potentiometers which are limited in their ability to create a non-linear rate of change of their resistance are thus limited in their ability to change the gate voltage at a required non-linear rate of change to thereby change the intensity of the lamp at a required rate. If the potentiometer does not include the necessary rate of change of its resistance as the operator rotates the potentiometer knob, he will change the lamp intensity from "DIM" to "BRIGHT" but the rate of change of intensity will not be as desired. It is noteworthy to realize that a second resistive element must be placed in series with the potentiometer if it is to provide a variable gate voltage. This second resistive element adds expense and complexity to the device.

SUMMARY OF INVENTION

In the current invention the output of a Hall effect sensor is used as the gate voltage for an intermediate element such as a metal oxide field effect transistor (MOSFET). The Hall effect sensor is a device which must be energized with a supply voltage. It consumes power even when its output is not being employed. Once it is energized it creates an output voltage which varies about a null potential. The output voltage is limited in range and can vary only plus or minus several volts from the null potential. This voltage variation from the null potential is directly related to the density and direction of the magnetic flux which intersects the Hall effect sensor. Linear Hall effect sensors provide a linear relationship between their output voltage and the intersecting magnetic flux density. This linear output will be beneficial as it will provide the desired gate voltage from some MOSFETS. The output of the Hall effect sensor is limited in the type of device it can operate directly because it will overheat if its electrical output current exceeds a limited value. The MOSFET is a semiconductor device that provides a variable resistance between its source and drain terminals. This variable resistance ranges from a low to a high value depending upon the particular MOSFET being considered. The exact value of the resistance between low and high values is determined by a voltage applied to the gate terminal of the MOSFET. The gate terminal has a high resistance and therefore draws only minimal current, thus, the MOSFET requires only a very small amount of power to adjust its variable resistance. Since the MOSFET can satisfactorily handle substantial current through its source-drain terminals, the MOSFET is an excellent device for controlling a high wattage output device. The output element can be any of a number of electrical devices such as a lamp, bell, buzzer, amplifier, etc.

The output from the Hall effect sensor can be connected directly to the input of a low power output element thus eliminating the MOSFET. However, this embodiment finds limited use because control of most output elements requires the control of current beyond the capacity of the Hall effect sensor. In the current embodiment the output of the Hall effect sensor controls the gate voltage of the MOSFET which in turn controls the source-drain resistance of the MOSFET. The source-drain resistance of the MOSFET is usually placed in a series circuit relationship with the power supply and output element or lamp. A low value of source-drain resistance will shift a higher portion of the available voltage to the lamp increasing its intensity. Conversely, as the source-drain resistance increases the voltage across the lamp decreases and the lamp dims.

There are only a limited number of MOSFETs from which to choose and for a particular MOSFET the source-drain resistance has a range from a low to a high value. It is important to realize that the source-drain resistance range of the MOSFET must be correlated with the electrical characteristics of the lamp in order for the variable output electrical device to function properly. When placed in series with a chosen lamp the lamp must be acceptably bright if the source-drain resistance is at its low value and acceptably dim when the source-drain resistance is at its high value. Also, even if a MOSFET with an acceptable resistance range is employed the rate of change of that resistance must be correlated with the electrical characteristics of the lamp. If the source-drain resistance changed in a non-linear fashion from low to high too quickly, the lamp would correspondingly change from bright to dim too quickly. Therefore, both the range and the rate of change of the source-drain resistance must be correlated with the lamp for the proper functioning of the variable output electrical device. Furthermore since the gate voltage of the MOSFET controls its source-drain resistance, the range and the rate of change of the applied gate voltage must be controlled accordingly. Selection of an acceptable Hall effect sensor must also be made with due regard for its input and output characteristics. Since the output of the Hall effect sensor determines the gate voltage of the MOSFET, the Hall effect sensor must be chosen so that its output voltage range and output voltage rate of change are matched with the voltage needs at the gate of the MOSFET. If an acceptable Hall effect sensor with the required output characteristics is located, it must be remembered that its output voltage is a function of the density and direction of magnetic flux which intersects it. Therefore the range and rate of change of the density of the magnetic flux density which intersects the Hall effect sensor must also be controlled. There are only a limited number of Hall effect sensors and MOSFETs to choose from. Therefore it is not always possible to match the characteristics of these components to design a workable electrical device using a particular output element or lamp. An additional component can sometimes be added to correct the mismatch but this additional component must also have the necessary input-output characteristics. Even if an additional component can be found it still may not function because of voltage or power losses. Also, an additional component will increase the cost of the device. If all of the component elements do not have their input-output signals correlated in both range and rate of change, the output signal from the variable output electrical device will not exhibit an acceptable range and rate of change.

It is therefore an object of the present invention to provide a variable output electrical device which has an output signal that includes a parameter with a range and rate of change controlled by the movement of one movable element of the device.

It is a further object of this invention to provide a variable output electrical device which when first energized by the movement of a cover by an operation emits hight including intensity at dim value. The design can be further configured so that the intensity is at any predetermined value within its range at the instant the variable output electrical device is switched "ON" and the value of the intensity can be changed by movement of the cover.

It is a further object of this invention to provide a variable output electrical device which has its output signal determined by the movement of a movable element which alters the density of a magnetic field intersecting a sensor element. The movable element is electrically isolated from the electric circuitry thereby eliminating a potential shock hazard.

DESCRIPTION OF THE PREFERRED EMBODIMENT

Figure 1:
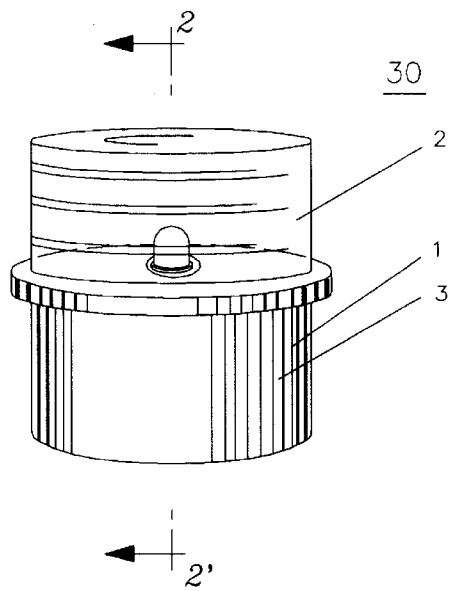
FIG. 1 is a perspective view of electrical device 30.
Figure 2:
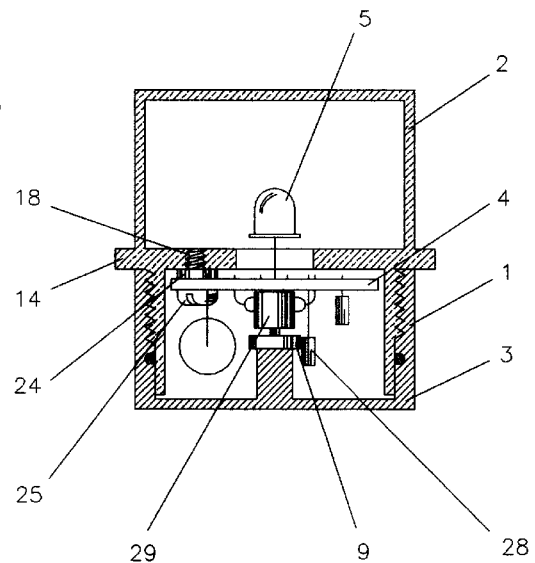
FIG. 2 is a cross-sectional view of electrical device 30 across line 2—2' of FIG. 1.
Figure 3:
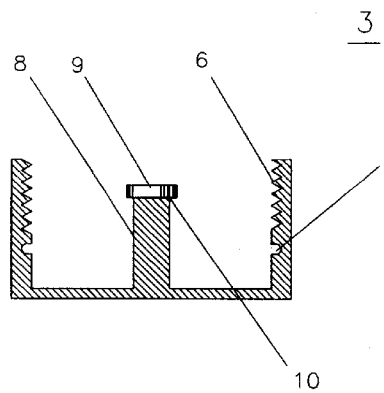
FIG. 3 is a view of the base removed from FIG. 3.
Figure 4:
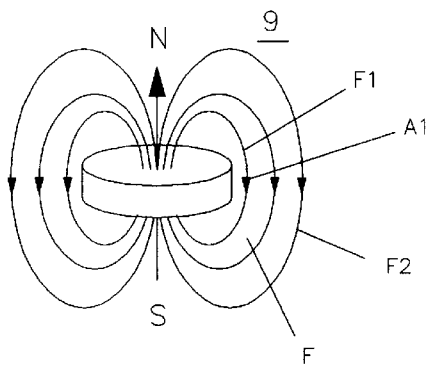
FIG. 4 is a perspective view of the magnet removed from the base of FIG. 3.

Variable output electrical device 30 as shown in FIG. 1 includes housing 1 which consists of transparent cover 2 and base 3. FIG. 2 is a sectional view taken across line 2—2' of FIG. 1. In FIG. 2 the internal components are viewed without sectioning. Cover 2 supports circuit assembly 4 which in turn supports output element or lamp 5. When activated lamp 5 emits a visual output signal which passes through transparent cover 2. The visual output signal is usually required to meet a specification output parameter such as intensity. Embodiments for other uses could provide electrical or audible output signals. As the intensity of lamp 5 is increased by a means to be described later, the visual output signal it emits is more easily observed. FIG. 3 depicts base 3 removed from FIG. 2. Base 3 can be constructed of a transparent plastic and includes internal threads 6, O-ring groove 7, and pedestal 8. Magnet 9 is fastened to pedestal 8 using glue 10. FIG. 4 shows magnet 9 removed from base 3. Magnet 9 creates magnetic field F with north N and south S poles. In accordance with classical magnetic field nomenclature, line F1 represents the locations of high density magnetic field points or zones. Magnetic field line F2 represents the locations of reduced density magnetic field points or zones. The intensity and direction of the magnetic field is a function of the strength of the magnet and the relative location between the magnet and the point within the magnetic field which is of interest. Arrowhead Al represents the direction of the magnetic field.

Figure 5:
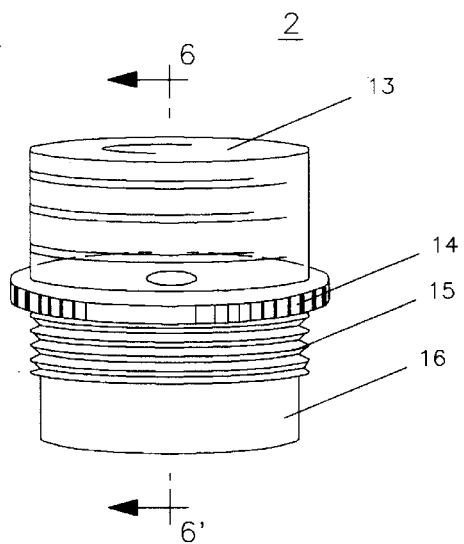
FIG. 5 is a perspective view of the cover removed from FIG. 1.
Figure 6:
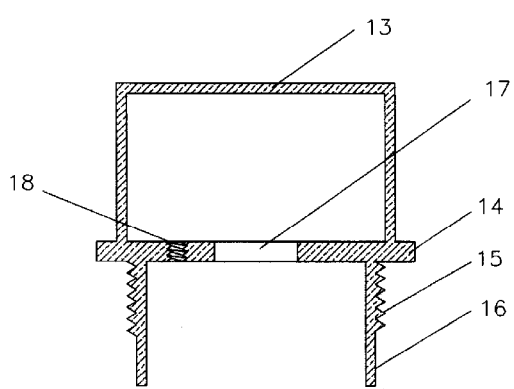
FIG. 6 is a cross-sectional view of the cover across line 6—6' of FIG. 5.

FIG. 5 is cover 2 removed from FIG. 1. FIG. 6 is a crosssectional view of cover 2 across line 6—6' of FIG. 5. As seen in FIGS. 5 and 6, cover 2 is molded of a transparent plastic and includes top 13, flange 14, external thread 15, sealing ring 16, lamp hole 17 and threaded circuit mount hole 18.

Figure 7:
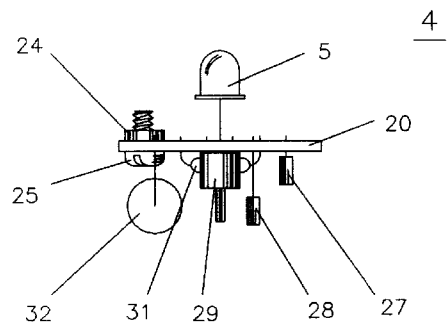
FIG. 7 is a front view of the circuit assembly removed from FIG. 2.
Figure 8:
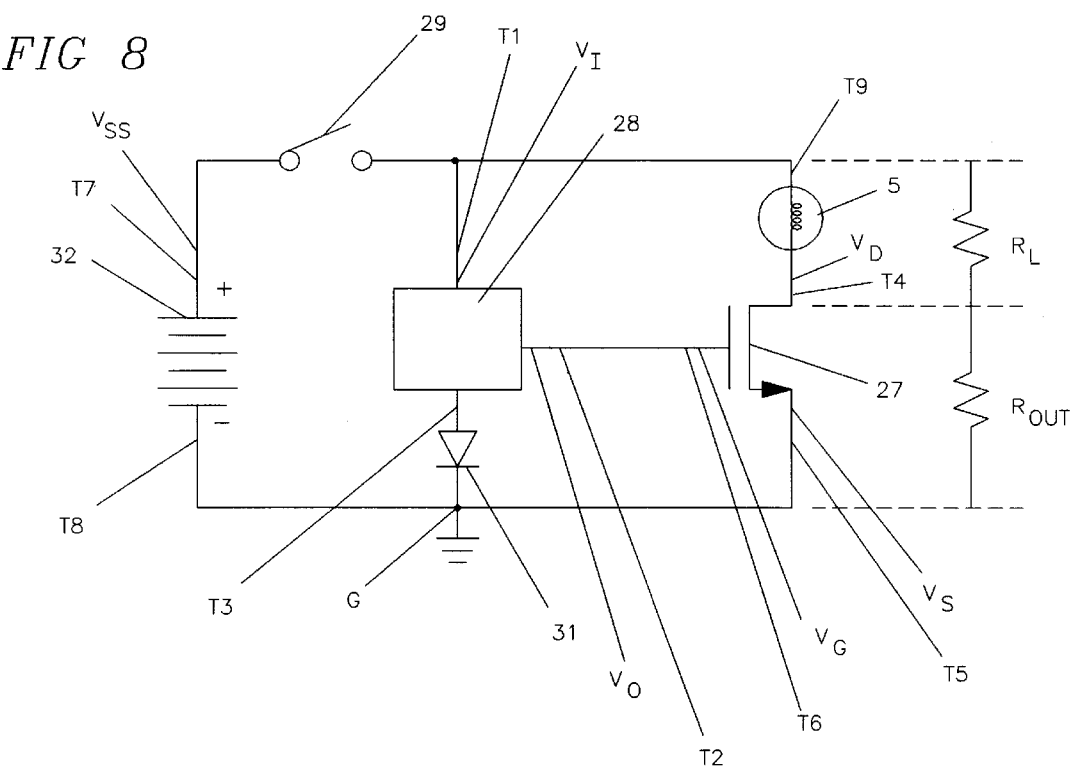
FIG. 8 is an electrical schematic of the FIG. 7 circuit assembly.
Figure 9:
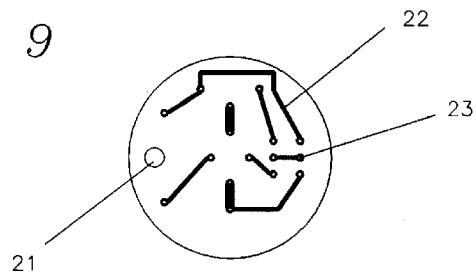
FIG. 9 is a top view of circuit board 20 removed from the FIG. 7 circuit assembly.

FIG. 7 is circuit assembly 4 removed from FIG. 2. FIG. 8 is the electrical schematic of the FIG. 7 circuit assembly. FIG. 9 is printed circuit board 20 removed the FIG. 7 circuit assembly 4. In FIG. 9 printed circuit board 20 includes circuit board mount hole 21, solder tracks 22 and component mounting holes 23. Looking at FIGS. 2, 7, 8 and 9, circuit assembly 4 will be fastened to cover 2 of FIG. 2 separated by spacer 24 with mount screw 25 passing through circuit board mount hole 21 of circuit board 20 and threading into threaded circuit mount hole 18. Circuit assembly 4 components include; lamp 5, MOSFET 27, Hall effect sensor 28, push-button switch 29, diode 31 and battery 32, all soldered using their respective terminals to circuit board 20 onto solder tracks 22 through solder holes 23. Typical circuit assembly 4 components selected for a successful design would include the following:

1) Hall effect sensor 28 manufactured by Allegro part #UGN 3503UA,
2) MOSFET 27 manufactured by Zetex part #ZVN 4206A,
3) Diode 31 manufactured by Phillips part #BYU10-30PH,
4) Lamp 5 manufactured by Carley part #779,
5) Battery 32—6 Volt.

Figure 10:
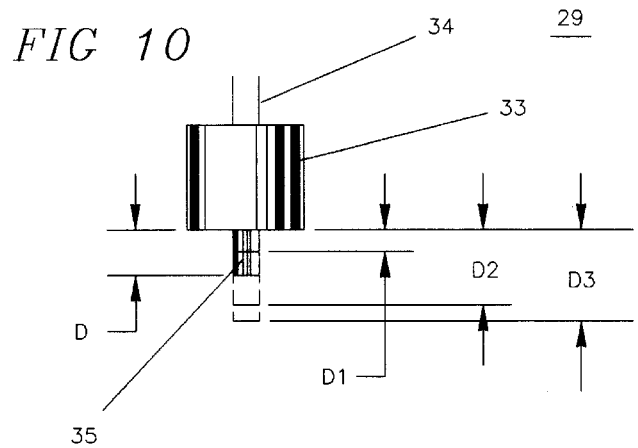
FIG. 10 is an enlarged view of push-button switch 29 removed from FIG. 7.

Solder tracks 22 are illustrative only as they can be formed in a variety of acceptable configurations which are acceptable as long as the configuration forms the components of circuit assembly 4 into a circuit as shown in the schematic of FIG. 8. FIG. 10 is a front view of push-button switch 29 removed from circuit assembly 4 of FIG. 7. Push-button switch 29 includes body 33, terminals 34 and plunger 35. Plunger 35 is shown at height distance D in which it is in the "ON" or closed circuit position. Plunger 35 is spring loaded so that absent any external forces it is not depressed to height distance D as shown in FIG. 10 but fully extended at a plunger height distance D3. This is the "OFF" or open circuit mode. Push button switch 29 remains in the "OFF" mode until the plunger 35 height distance D is reduced to distance D2 at which point it turns "ON". Push button switch 29 remains in the "ON" mode as overtravel as plunger 35 height distance D is further reduced until plunger 35 is at height distance D1. At this position, push button switch 29 is at the maximum "ON" position and plunger 35 cannot be depressed further without resulting in physical damage.

Referring back to FIGS. 7 thru 10, Hall effect sensor 28 includes supply terminal T1, output terminal T2, and ground terminal T3. MOSFET 27 includes drain terminal T4, source terminal T5, and gate terminal T6. Unless otherwise specified all voltages referenced herein are those values relative to ground G. $R_{OUT}$ is the resistance between MOSFET drain terminal T4 and source terminal T5. Resistance $R_{OUT}$ varies and is controlled by gate voltage $V_G$. Lamp resistance is the load resistance $R_L$ between lamp terminal T9 and MOSFET drain terminal T4. Battery 32 includes positive terminal T7 and negative terminal T8. Battery voltage $V_{SS}$ is equal to the voltage at positive battery terminal T7.

Diode 31 is used to protect against reverse polarity and it is located between Hall Effect Ground Terminal T3 and ground G. In this location diode 31 prevents Hall effect sensor 28 from damage that could result from a reverse current.

Figure 11:
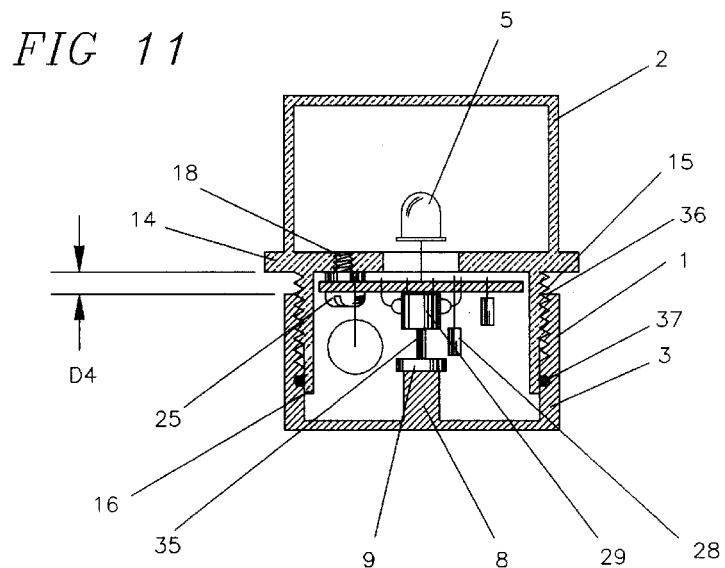
FIG. 11 is a cross-sectional view of electrical device 30 similar to FIG. 2 except cover 2 is partially unscrewed.

FIG. 11 is similar to FIG. 2 except cover 2 is partially unscrewed from base 3 so that separation distance D4 is created between flange 14 of cover 2 and top 36 of base 3. Cover 2 which can be considered a movable element is rotated to alter the height distance D of plunger 35 of push-button switch 29 to thereby control the supply voltage V1 applied to Hall effect sensor 28. Simultaneously the rotation of cover 2 controls the density and the direction of the magnetic flux intersecting Hall effect sensor 28 to thereby control the intensity of lamp 5. External thread 15 of cover 2 mates with internal thread 6 of base 3 so that cover 2 can be slowly separated from base 2. It can be moved to a desired separation distance D4 and left at that position. It can also be moved to any separation distance D4 within the range provided by the length of the respective threads. The threads are designed to provide the range of separation distance D4 necessary to provide the range of movement of magnet 9 relative to Hall effect sensor 28 necessary to effect an acceptable range of intensity of lamp 5. The pitch of external thread 15 cooperates with the operators controlled unthreading movement as he unscrews cover 2 to establish the rate of change of distance D4. The magnitude and rate of change of separation distance D4 will according to a means to be later described determine the magnitude and rate of change of the intensity of lamp 5. Although cover 2 is identified as the movable element in the current description base 3 could equally have been considered as the movable element. Alternatively pedestal 8 instead of being an integral part of base 3 could have been a separate component passing through and forming a sliding relationship with base 3. In this configuration, pedestal 8 could be employed to move magnet 9 to therefore become the movable element. O ring 37 is located in O ring grove 7 of base 3 and presses against sealing ring 16 of cover 2 to provide a watertight seal. The dimensions of cover 2 and base 3 are established such that the sealing action is maintained throughout the range of separation distance D4.

Figure 12:
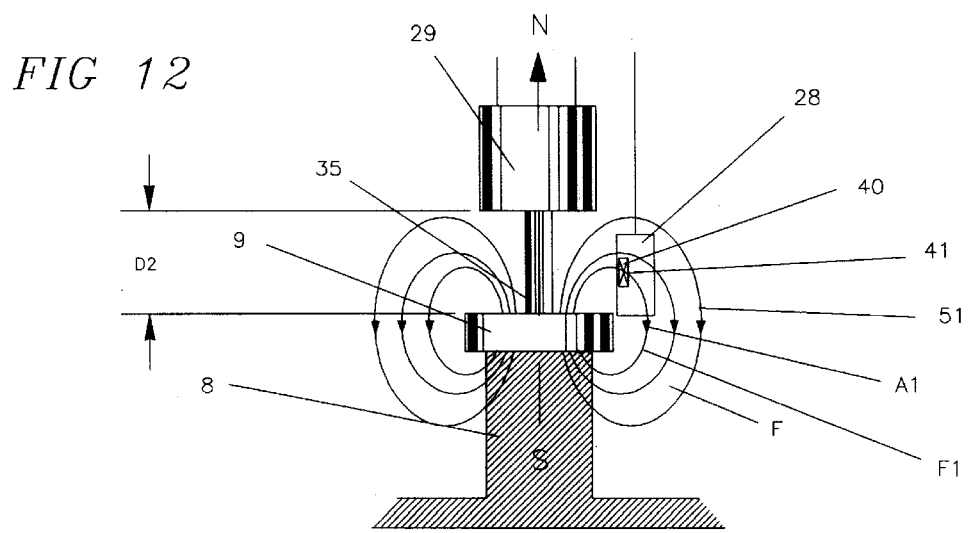
FIG. 12 is an enlarged view of the central portion including the magnet, switch and sensor removed from FIG. 11.

FIG. 12 is an enlarged view of magnet 9, Hall effect sensor 28 and push button switch 29 removed from FIG. 11.

In the FIG. 12 view, plunger 35 of push-button switch 29 is at a height distance D Just equal to height distance D2. Therefore push-button switch 29 is "ON". If cover 2 is unscrewed further increasing separation distance D4 magnet 9 is moved a small additional distance from push-button switch 29 causing plunger 39 to be at a height distance D slightly larger than height distance D2. This will turn push-button switch 29 "OFF" disconnecting battery terminal $T_7$ from supply terminal $T_1$ preventing battery voltage $V_{SS}$ from being applied to supply terminal T1 of hall effect sensor 28. Referring now to FIGS. 1 through 12, when push-button switch 29 is in the "OFF" mode supply voltage $V_I$ at supply terminal $T_1$ of Hall effect sensor 28 equals 0. In this mode no power is supplied to Hall effect sensor 28 and consequently its output voltage $V_O$ at output terminal T2 equals 0. Since output terminal T2 is wired directly to gate terminal T6 of MOSFET 27, gate voltage $V_G$ is equal to output voltage $V_O$ and is therefore also equal to 0. According to the operating characteristics of MOSFET 27 when gate voltage $V_G$ equals 0 resistance $R_{OUT}$ is extremely high in value usually exceeding thousands of megaohms. Due to the characteristics of lamp 5 load resistance $R_L$ is relatively low in value. Since resistance $R_{OUT}$ and resistance $R_L$ are in series with battery 32, they divide battery voltage $V_{SS}$ with the voltage across each proportional to their magnitudes. The voltage across each resistor is determined using classical voltage division calculations. With $R_{OUT}$ relatively much larger than $R_L$ almost no voltage will appear across $R_L$ and, therefore, lamp 5 will not light.

During the normal operation of variable output electrical device 30, Hall effect sensor 28, prior to having been energized with a supply voltage $V_I$ at terminal T1 is intersected, as seen in FIG. 12, by field line F1 of magnetic field F. Field line F1 represents a high density or high intensity magnetic flux. Hall effect sensor 28 includes active zone 40 which is the portion of Hall effect 28 that actually responds to the intersecting magnetic flux density. Generally, references made within this application to the density of magnetic flux intersecting Hall effect sensor 28 actually relate to the density of magnetic flux intersecting active zone 40 located within the package of Hall effect sensor 28. In FIG. 12 the arrowhead A1 of magnetic field line F1 is directed leaving rear face 41 of active zone 40 indicating a negative high density flux portion of magnetic field F intersecting active zone 40.

Figure 13:
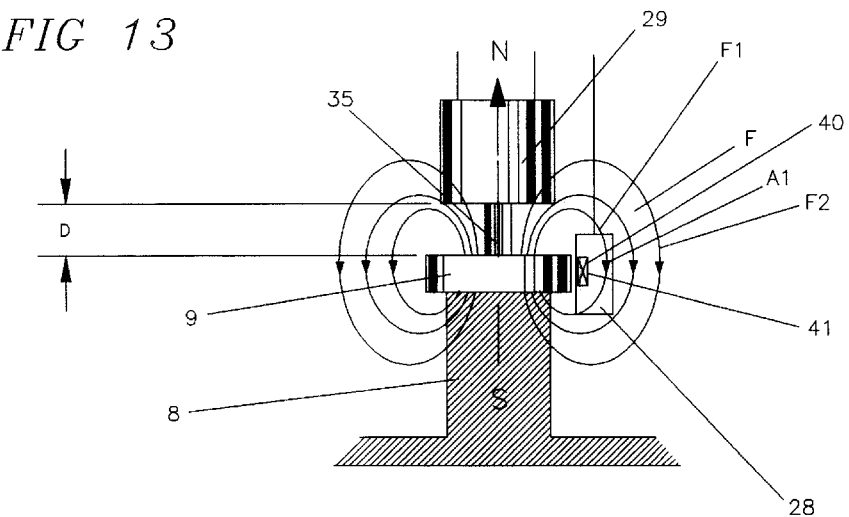
FIG. 13 is an enlarged view similar to FIG. 12 except that the relationship between the magnet and the Hall effect sensor has been changed.

If the operator activates variable output electrical device 30 by screwing cover 2 a slight distance into base 3 magnet 9 depresses plunger 35 of push button switch 29 so that height distance D equals distance D2. At this point push button switch 29 turns "ON" making supply voltage $V_I$ equal to battery voltage $V_{SS}$, thereby powering Hall effect sensor 28. Energized Hall effect sensor 28 responding to the previously described existing intersecting high density negative magnetic flux creates an output voltage $V_O$ which is minimal but larger than O. Since voltage $V_O$ equals voltage $V_G$ resistance $R_{OUT}$, although dropping in value, remains high compared to load resistance $R_L$ again minimizing the voltage across lamp 5. Lamp 5 is therefore "OFF" or still extremely dim. Lamp 5 can be considered the output element of this embodiment with intensity as its measurable output signal parameter. FIG. 13 is similar to FIG. 12 except the relationship between magnet 9 and Hall effect sensor 28 has changed. This change would be accomplished if the operator slowly screwed cover 2 further into base 3 to further reduce separation distance D4 and to correspondingly further reduce height distance D of push button switch 29 to a value between height distance D1 and height distance D2. As can be seen in FIG. 13, there are almost no field lines intersecting rear face 41 of active zone 40. The field lines are substantially parallel to rear face 41. Thus during the slow movement of magnet 9 from the FIG. 12 to the FIG. 13 relationship with Hall effect sensor 28 the density of negative magnetic flux intersecting Hall effect sensor 28 slowly decreased. According to the characteristics of Hall effect sensor 28, this decrease in the negative magnetic flux density intersecting Hall effect sensor 28 would increase its output voltage $V_O$. Since $V_G=V_O$, $V_G$ is similarly increased. This according to the characteristics of the MOSFET causes resistance $R_{OUT}$ to further decrease, slowly increasing the voltage across lamp 5. When the negative magnetic flux density intersecting Hall effect sensor 28 is reduced as seen in FIG. 13 to approximately zero, Hall effect sensor 28 is at its quiescent state where the output voltage $V_O$ is equal to the null voltage of Hall effect sensor 28. For the components shown the null voltage is approximately one half of the supply voltage $V_I$ or in this embodiment, one half of the battery voltage $V_{SS}$. In the FIG. 13 position output voltage $V_O$ has decreased to the null voltage of Hall effect sensor 28 and lamp 5 is at medium brightness.

Figure 14:
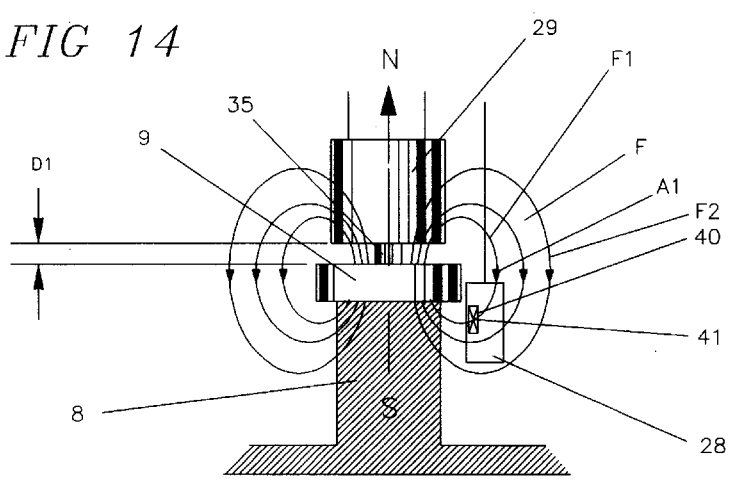
FIG. 14 is an enlarged view of the central portion including the magnet, switch and sensor removed from FIG. 2.

In FIG. 14 the relationship between magnet 9 and Hall effect sensor 28 has changed from that depicted in FIG. 13. This change would be accomplished if the operator slowly screwed cover 2 further into base 3 to further reduce separation distance D4. During the slow movement of magnet 9 from the FIG. 13 to the FIG. 14 position, the density of magnetic flux intersecting rear face 41 of active zone 40 of Hall effect sensor 28 slowly increased from almost zero to a maximum positive value. The magnetic flux density is indicated by high density field line F1 intersecting rear face 41. The direction of arrowhead A1 has reversed from FIG. 12 and indicates the magnetic flux is now positive. As cover 2 was first rotated, the magnetic flux density intersecting Hall effect sensor 28 first changed from zero to become slightly positive. This caused gate voltage $V_G$ to further increase in value causing the value of resistor $R_{OUT}$ to further decrease in value whereby the voltage across lamp 5 and the intensity of lamp 5 both increased. As cover 2 was further rotated the positive magnetic flux density intersecting Hall effect sensor 28 further increased to achieve the relationship shown in FIG. 14 where the gate voltage $V_G$ has reached its maximum value and is approximately equal to one half battery voltage $V_{SS}$. In this condition, resistance $R_{OUT}$ is at its minimum value providing the maximum voltage across lamp 5. Lamp 5 now is emitting its most intense signal. In this position of cover 2, separation distance D4 is approximately zero as shown in FIG. 2. Plunger 35 of push button switch 29 is depressed by magnet 9 to a height distance D slightly greater than height distance D1 and therefore, supply terminal $T_1$ of Hall effect sensor 28 is still connected to battery 32 which is still energizing Hall effect sensor 28.

It can be seen from FIGS. 12 through 14 that the magnetic field F intersecting Hall effect sensor 28 changes direction as well as density. Changing the density of magnetic flux intersecting Hall effect sensor 28 would by itself not create the necessary range of output voltage $V_O$ or the related range of MOSFET 27 gate voltage $V_G$ necessary to create the required range of output intensity of lamp 5. Locating and moving magnet 9 so that the magnetic field changes both in density and direction solves this problem.

In addition to the relationship between the magnitudes of the values and the ranges of the input and output signals of each of the circuit assembly 4 components, it is important to incorporate into the design a correlation between the rate of change of each of these signals. The rate of change of resistance $R_{OUT}$ depends on the rate of change of voltage $V_G$. The rate of change of voltage $V_G$ depends on the rate of change of voltage $V_O$ which directly depends on the rate of change of the magnetic flux density intersecting Hall effect sensor 28. The rate of change of the magnetic flux density intersecting Hall effect sensor 28 is controlled by the rate of movement of cover 2 relative to base 3. If the rates of change of the various signals are not properly controlled and matched, the output signal of the output element or lamp 5 may not be acceptably controlled. Practically this means the intensity may change too quickly to be acceptable.

Figure 15:
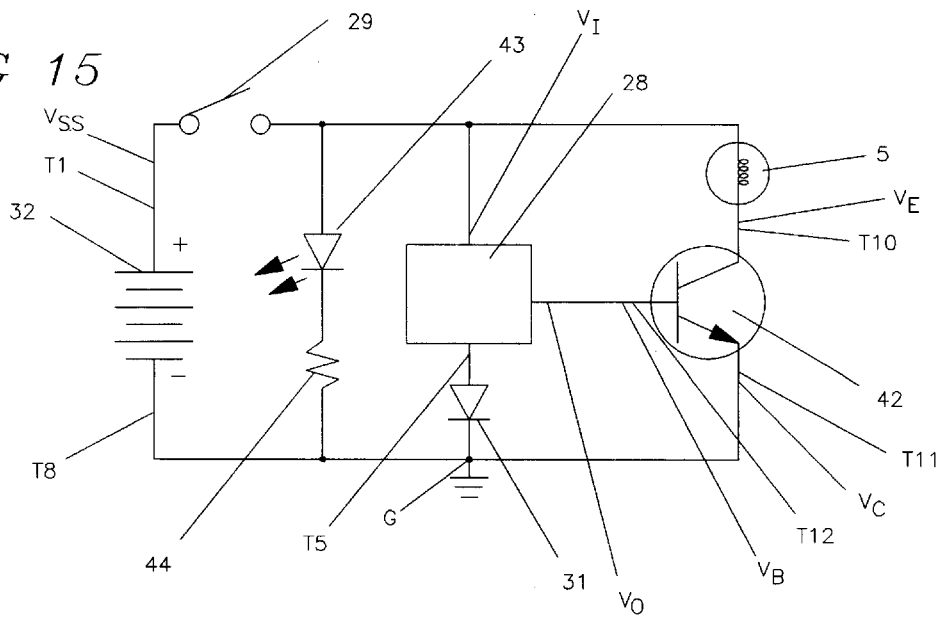
FIG. 15 is an electrical schematic of an alternate circuit assembly which can replace the circuit shown in the FIG. 8 schematic.

FIG. 15 is similar to FIG. 8, with bipolar NPN transistor 42 substituted for MOSFET 27. Bipolar transistor 42 is shown replacing MOSFET 27 to show that there are other electronic devices that can replace MOSFET 27. The FIG. 15 circuit functions in a manner similar to that of the FIG. 8 circuit with collector terminal T10 replacing drain terminal T4, emitter terminal T11 replacing source terminal T5 and base terminal T12 replacing gate terminal T6. The drain voltage $V_D$, source voltage $V_S$ and gate voltage $V_G$ of FIG. 8 correspond in function to the emitter voltage $V_E$, collector voltage $V_C$ and base voltage $V_B$ of FIG. 15, respectively. Using basic circuit analysis as used for FIG. 8 it can be easily seen that bipolar transistor 42 can control the intensity of the lamp 5. However, for many uses bipolar transistor 42 would, because of its input-output characteristics, not function acceptably.

The FIG. 15 circuit has an additional feature which can apply to the FIG. 8 circuit as well. When push button switch 29 is "ON" and the negative magnetic flux density intersecting Hall effect sensor 28 is at its maximum negative voltage value, $V_O$ is low in value relative to ground G and the circuit provides only minimal power to lamp 5. In this condition it is difficult to tell if the circuit is consuming power and the operator may inadvertently leave the device on. Resistor 44 and light emitting diode 43 are provided to visually indicate when power is supplied to Hall effect sensor 28. If push button switch 29 is "ON" the potential at $V_I$ is equal to $V_{SS}$, then power is supplied to LED 43 and Resistor 44 thus illuminating LED 43 and indicating that the circuit is active.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. For instance, in the current embodiment cover 2 is moved so that magnet 9 moves in a linear fashion relative to Hall effect sensor 28. It should be realized that this is one of numerous methods to alter the density of the magnetic field intersecting Hall effect sensor 28. It would be obvious to create a design which rotated the magnetic field relative to Hall effect sensor 28 in order to create a change in the density of the magnetic field F intersecting Hall effect sensor 28. Furthermore, it would also be obvious to use cover 2 to insert a ferrous element between magnet 9 and Hall effect sensor 28 to thereby alter the density of the magnetic field intersecting Hall effect sensor 28.

Also, in the current embodiment as shown in FIG. 12 push-button switch 29 is correlated with the density and direction of magnetic field F intersecting Hall effect sensor 28 so that at the instant Hall effect sensor 28 is energized lamp 5 appears to be very dim or even "OFF". This is the most common design. However, it would be easy to adjust the design so that a different portion of magnetic field F was intersecting Hall effect sensor 28 at the instant it was energized so that lamp 5 would commence to emit at a different intensity. Using this technique lamp 5 can be at any intensity at the instant Hall effect sensor 28 is energized.

Finally, a circuit could be designed to use another magnetically responsive sensor such as a magnetic diode as a substitute for Hall effect sensor 28.

It is understood, therefore, that within the scope of the appended claims, the invention may be practiced otherwise then as specifically set forth herein.

What is claimed is:

1. A variable output electrical device including:

a source of electrical power;

a magnet means for creating a magnetic field, said magnetic field including a magnetic flux;

a sensor means comprising a sensor element for emitting an electrical sensor output signal controlled by a density of said magnetic flux intersecting said sensor element;

an output means comprising an output element for emitting a perceivable output signal controlled by said electrical sensor output signal;

a circuit means comprising said source of electrical power, said sensor means, said output means and a switch for selectively connecting said source of electrical power to said sensor means and said output means for said source of electrical power supplying an electrical power to said sensor means and said output means;

a support means for disposing said sensor element relative to said magnet means to effect said magnetic flux intersecting said sensor element; and an adjustment means for a movement of a movable element to vary said density of said magnetic flux intersecting said sensor element to vary said perceivable output signal and to vary said electrical power supplied to said output means.

2. A variable output electrical device including:

a source of electrical power;

a magnet means for creating a magnetic field, said magnetic field including a magnetic flux;

a sensor means comprising a sensor element for emitting an electrical sensor output signal controlled by a density of said magnetic flux intersecting said sensor element;

an output means comprising an output element for emitting a perceivable output signal controlled by said electrical sensor output signal;

a circuit means comprising said source of electrical power, said sensor means, said output means and switch for selectively connecting said source of electrical power to said output means for said source of electrical power supplying an electrical power to said output means;

a support means for disposing said sensor element relative to said magnet means to effect said magnetic flux intersecting said sensor element; and an adjustment means through a determined range of said movement increasing an intensity of said perceivable output signal.

3. A variable output electrical device including:

a source of electrical power;

a magnet means for creating a magnetic field, said magnetic field including a magnetic flux;

a sensor means comprising a sensor element for emitting an electrical sensor output signal controlled by a density and a direction of said magnetic flux intersecting said sensor element;

an output means comprising an output element for emitting a perceivable output signal controlled by said electrical sensor output signal;

a circuit means comprising said source of electrical power, said sensor means, said output means and a switch for selectively connecting said source of electrical power to said output means for said source of electrical power supplying an electrical power to said output means;

a support means for disposing said sensor element relative to said magnet means to effect said magnetic flux intersecting said sensor element; and an adjustment means for a movement of a movable element varying said density of said magnetic flux intersecting said sensor element to vary said perceivable output signal and reversing said direction of said magnetic flux intersecting said sensor element to extend a range of and intensity of said perceivable output signal.

4. A variable output electrical device including:

a source of electrical power;

a magnet means for creating a magnetic field, said magnetic field including a magnetic flux;

a sensor means comprising a sensor element for emitting an electrical sensor output signal controlled by a density of said magnetic flux intersecting said sensor element;

an intermediate means comprising an intermediate element for emitting an intermediate electrical output signal controlled by said electrical sensor output signal;

an output means comprising an output element for emitting a perceivable output signal controlled by said intermediate electrical output signal;

a circuit means comprising said source of electrical power, said sensor means, said intermediate means said output means and a switch for selectively connecting said source of electrical power to said output means for said source of electrical power supplying an electrical power to said output means;

a support means for disposing said sensor means relative to said magnet means to effect said magnetic flux intersecting said sensor element; and an adjustment means for a movement of a movable element varying said density of said magnetic flux intersecting said sensor element to vary said electrical power and to vary said perceivable output signal.

5. A variable output electrical device including:

a source of electrical power;

a magnet means for creating a magnetic field, said magnetic field including a magnetic flux;

a sensor means comprising a sensor element for emitting upon the application of said source of electrical power to said sensor means an electrical sensor output signal controlled by a density of said magnetic flux intersecting said sensor element;

an output means comprising an output element for emitting a perceivable output signal controlled by said electrical sensor output signal;

a circuit means comprising said source of electrical power, said sensor means said output means and a switch for selectively connecting said source of electrical power to said output means for said source of electrical power supplying an electrical power to said sensor means;

a support means for disposing said sensor means relative to said magnet means to effect said magnetic flux intersecting said sensor element; and an adjustment means for a movement of a movable element applying said source of electrical power to said sensor means to vary said density of said magnetic flux intersecting said sensor element and to vary said perceivable output signal.

6. A variable output electrical device including:

a source of electrical power comprising a battery;

a magnet means for creating a magnetic field a said magnetic field including a magnetic flux;

a sensor means comprising a sensor element for emitting an electrical sensor output signal controlled by a density of said magnetic flux intersecting said sensor element;

an output means comprising an incandescent lamp for emitting a light with an intensity controlled by said electrical sensor output signal;

a circuit means comprising said source of electrical power, said sensor means and said output means and a switch for selectively connecting said source of electrical power to said output means for said source of electrical power supplying an electrical power to said output means;

a support means for disposing said sensor means relative to said magnet means to effect said magnetic flux intersecting said sensor element; and an adjustment means for a movement of a movable element to vary said density of said magnetic flux intersecting said sensor element to vary said intensity of said light and to regulate said electrical power supplied to said lamp.

7. A variable output electrical device according to any of claims 1, 2, 3, 5 or 6 wherein said circuit means further includes:

an intermediate means for controlling a voltage applied to said output means.

8. A variable output electrical device according to any of claims 1, 2, 3, 5 or 6 wherein said circuit means further includes:

an intermediate means for controlling a voltage applied to said output means; and, said intermediate means comprising a metal oxide field effect transistor.

9. A signal device comprising a housing having a base and a cover, said cover being movably mounted relative to said base and having a transparent surface thereon;

a magnet mounted within said housing to create a magnetic field within said housing; and a circuit assembly fastened to one of said base and said cover for movement relative to said magnet, said circuit assembly including a lamp, a battery for supplying a voltage to said lamp to illuminate said lamp, a switch for selectively connecting said battery to said lamp, a Hall effect sensor for intersecting said magnetic field, and a transistor connected to said sensor and said lamp to deliver the variable voltage from said battery to said lamp, said sensor being connected to said battery and said transistor to vary the voltage delivered from said battery to said transistor whereby upon movement of said cover relative to said base, said switch is activated in a first position of said cover and said Hall effect sensor is energized to respond to a first magnetic flux density from said magnetic field to deliver a first output voltage to said lamp and whereby upon further movement of said cover relative to said base, said Hall effect sensor responds to a second magnetic flux density from said magnetic field of different value than said first magnetic flux density to deliver a second output voltage to said lamp.

10. A signal device as set forth in claim 9 wherein said magnet is mounted on said base and said circuit assembly is mounted on said cover.

11. A signal device as set forth in claim 10 wherein said cover is threaded into said base to rotate relative to said base.

12. A signal device as set forth in claim 9 wherein said circuit assembly further includes a light emitting diode mounted in said housing for viewing through said transparent surface, said diode being activated in response to power being supplied to said Hall effect sensor.

13. A signal device as set forth in claim 9 wherein said transistor is selected from the group consisting of a bipolar transistor, a field effect transistor and a metal oxide field effect transistor.

14. A signal device as set forth in claim 9 wherein said sensor is movable through said magnetic field between one position with the magnetic flux of said field intersecting said sensor in one direction and a second position with the magnetic flux of said field intersecting said sensor in an opposite direction.

15. A signal device as set forth in claim 9 wherein said circuit assembly includes a diode connected between said sensor and ground to prevent a reverse current to said sensor.

16. An electrical lighting device comprising
a source of electrical power;
a light emitting diode connected to said source for emitting light in response to said source of electrical power energizing said diode;
an incandescent lamp for emitting light in response to said source of electrical power energizing said lamp and a power control means including a movable element for movement to a first position to connect said source of electrical power to said diode and to a second position to connect said source of electrical power to said incandescent lamp.

17. An electrical lighting device as set forth in claim 16 wherein said power control means includes a magnet having a magnetic field and said movable element is a Hall effect sensor intersecting said magnetic field.

18. An electrical lighting device comprising
a circuit assembly including
a light emitting diode connectable to a power source having a voltage for energizing said circuit assembly said light emitting diode being responsive to the application of at least a first voltage to emit light;
an incandescent lamp connectable to the power source for emitting light in response to the application of at least a second voltage; and
a voltage control having a movable element, said voltage control at a first position of said movable element delivering at least said first voltage to said light emitting diode and at a second position of said movable element delivering at least said second voltage to said incandescent lamp.

19. An electrical lighting device as set forth in claim 18 wherein said voltage control comprises a switch.

20. An electrical lighting device as set forth in claim 18 wherein said lamp remains de-energized at said first position of said movable element.

21. An electrical lighting device as set forth in claim 18 which further comprises a battery as the power source.

22. An electrical lighting device as set forth in claim 18 wherein said voltage control includes a means for energizing said circuit assembly with the power source and illuminating at least one of said light emitting diode and said incandescent lamp in response to said circuit assembly being energized by the power source.

23. An electrical lighting device as set forth in claim 18 wherein said voltage control includes a magnet having a magnetic field and a Hall effect sensor disposed in intersecting relation with said magnetic field; said Hall effect sensor being connectable to and energizable by the power source to respond to a magnetic flux of said magnetic field to effect a sensor output voltage for delivery to said incandescent lamp as said second voltage.

24. An electrical lighting device as set forth in claim 18 wherein said voltage control includes a switch movably connected to said movable element for delivering at said first position of said movable element at least said first voltage to said light emitting diode, said voltage control further including a magnet having a magnetic field and a Hall effect sensor, said movable element additionally movably connecting said magnet and said Hall effect sensor, said Hall effect sensor intersecting said magnetic field at said second position of said movable element; and
said Hall effect sensor at said second position of said movable element being connectable to and energizable by the power source to respond to a magnetic flux of said magnetic field to effect a sensor output voltage for delivery to said incandescent lamp.

25. An electrical lighting device comprising
A circuit assembly including
a light emitting diode connectable to a power source having a voltage, said light emitting diode being responsive to the application of at least a first voltage to emit light;
an incandescent lamp connectable to the power source for emitting light in response to the application of at least a second voltage; and
a control means having a first position for energizing said circuit assembly with the power source and illuminating at least one of said light emitting diode and said incandescent lamp, said control means having a second position for illuminating at least another one of said light emitting diode and said incandescent lamp.

26. An electrical lighting device as set forth in claim 25 wherein said control means applies at least said first voltage to said light emitting diode at said first position and at said second position applies at least said second voltage to said incandescent lamp.

27. An electrical lighting device as set forth in claim 25 wherein said lamp remains de-energized at said first position of said movable element.

28. An electrical lighting device as set forth in claim 25 which further comprises a battery as the power source.

29. An electrical lighting device as set forth in claim 25 wherein said control means further includes a magnet having a magnetic field and a Hall effect sensor disposed in intersecting relation with said magnetic field; said Hall effect sensor at said second position of said control means being connectable to and energizable by the power source to respond to a magnetic flux of said magnetic field to effect a sensor output voltage for delivery to said incandescent lamp.

30. An electrical lighting device as set forth in claim 29 wherein said control means further includes a switch for connecting said control means at said first position of said control means to said light emitting diode to deliver at least said first voltage to said light emitting diode.

31. An electrical lighting device as set forth in claim 30 which further comprises a battery as the power source.

32. A dimmable lighting device comprising
a lamp connectable to a power source having a voltage for emitting light in response to the application of at least a first voltage from the power source;

a switch for selectively connecting said lamp to the power source for delivery of a voltage to said lamp;

a magnet having a magnetic field;

an adjustment means for varying a power supplied to said lamp, said adjustment means having a first position in said magnetic field for delivering said first voltage to said lamp and a second position in said magnetic field for delivering a second voltage greater than said first voltage to said lamp; and a support for supporting said lamp, said magnet and said adjustment means.

33. A dimmable lighting device as set forth in claim 32 wherein said adjustment means has a Hall effect sensor connected to and energized by the power source to respond to a magnetic flux of said magnetic field and effect a sensor output voltage; and said adjustment means at said first position disposing said Hall effect sensor at a first location in said magnetic field for delivering at least said first voltage to said lamp and at said second position disposing said Hall effect sensor at a second location in said magnetic field for delivering at least said second voltage to said lamp.

34. A dimmable lighting device as set forth in claim 32 wherein said adjustment means has a Hall effect sensor for connection to the power source at said first position to respond to a magnetic flux of said magnetic field and in effect a sensor output voltage; and said adjustment means at said first position disposing said Hall effect sensor at a first location in said magnetic field for delivering at least said first voltage to said lamp and at said second position disposing said Hall effect sensor at a second location in said magnetic field for delivering at least said second voltage to said lamp.

35. A dimmable lighting device as set forth in claim 32 further comprising said adjustment means having a Hall effect sensor and a switch, said switch connected between said power source and said Hall effect sensor, said switch at said first position connecting and energizing said Hall effect sensor with said power source to respond to a magnetic flux and effect a sensor output voltage; and said adjustment means at said first position disposing said Hall effect sensor at a first location in said magnetic field for delivering at least said first voltage to said lamp and at said second position disposing said Hall effect sensor at a second location in said magnetic field for delivering at least said second voltage to said lamp.

36. A dimmable lighting device as set forth in claim 33 wherein said adjustment means has a transistor connected to said Hall effect sensor for receiving said sensor output voltage from said Hall effect sensor, said transistor connected between said power source and said lamp to respond to said sensor output voltage and deliver at least said first voltage to said lamp.

37. A dimmable lighting device as set forth in claim 33 wherein said power source is a battery.

38. A dimmable lighting device as set forth in claim 33 wherein said adjustment means further includes a movable element for establishing said first position and said second position, said adjustment means for a slow movement of said movable element from said first position to said second position effecting a slow change from said first voltage to said second voltage delivered to said lamp.

39. A dimmable lighting device as set forth in claim 33 wherein said lamp is an incandescent lamp.

40. A dimmable lighting device comprising a light emitting diode connectable to a power source having a voltage for emitting light in response to the application of at least a first voltage from the power source;

a lamp connectable to the power source for emitting light in response to the application of at least a second voltage from the power source;

a magnet having a magnetic field;

a control means for delivering at least said first voltage to said light emitting diode at a first position thereof and for responding to said magnetic field and delivering at least said second voltage to said lamp at a second position thereof; and a support at least supporting at least one of said diode, said lamp, said magnet and said control means.

41. A dimmable lighting device as set forth in claim 40 wherein said control means further includes a movable element for establishing said first position and said second position.

42. A dimmable lighting device as set forth in claim 40 wherein said power source is a battery.

43. A dimmable lighting device as set forth in claim 40 wherein said lamp is an incandescent lamp.

44. A dimmable lighting device as set forth in claim 40 wherein said control means further includes a Hall effect sensor disposed intersecting said magnetic field, said Hall effect sensor at said second position of said control means connected to and energized by the power source to respond to a magnetic flux of said magnetic field to effect a sensor output voltage for delivery to said lamp; and said control means comprising a switch for at said first position of said control means delivering at least said first voltage to said light emitting diode.

45. A dimmable lighting device as set forth in claim 40 wherein said control means further includes a magnet having a magnetic field and a Hall effect sensor disposed intersecting said magnetic field, said Hall effect sensor at said second position of said control means being connectable to and energize by the power source to respond to a magnetic flux of said magnetic field to effect a sensor output voltage for delivery to said lamp.

46. A dimmable lighting device as set forth in claim 45 wherein said control means has a transistor connected to said Hall effect sensor for receiving said sensor output voltage, said transistor connected between said power source and said lamp for responding to said sensor output voltage and delivering at least said second voltage to said lamp.

47. A dimmable lighting device as set forth in claim 40 wherein said control means has a Hall effect sensor connected to and energized by said power source for responding to a magnetic flux of said magnetic field and effecting a sensor output voltage, said control means at said second position disposing said Hall effect sensor at a first location in said magnetic field for delivering at least said second voltage to said lamp; and said control means having a third position for disposing said Hall effect sensor at a second location in said magnetic field for delivering a third voltage greater than said second voltage to said lamp.

48. A dimmable lighting device as set forth in claim 47 wherein said control means further includes a movable element for establishing said second position and said third position and for a slow movement of said movable element from said second position to said third position effecting a slow change from said second voltage to said third voltage delivered to said lamp.

49. A dimmable lighting device comprising a circuit assembly including a lamp connectable to a power source having a voltage for emitting light in response to the application of at least a first voltage from the power source; a switch for a selective delivery of the voltage to said lamp and a voltage control including a Hall effect sensor;

a magnet having a magnetic field;

a movable element movably connecting said Hall effect sensor and said magnet, said movable element having a plurality of positions establishing a plurality of locations of said Hall effect sensor relative to said magnet, said Hall effect sensor connected to and energized with the voltage from said power source to respond to said Hall effect sensor intersecting said magnetic field to effect a sensor output voltage and deliver at least said first voltage to said lamp;

said Hall effect sensor at a first position of said movable element at a first location relative to said magnet and intersecting a first value of a magnetic flux from said magnetic field to effect a first value of the sensor output voltage and deliver said first voltage to said lamp, said Hall effect sensor at a second position of said movable element located at a second location relative to said magnet and intersecting a second value of said magnetic flux from said magnetic field to effect a second value of the sensor output voltage and deliver said second voltage to said lamp and to vary a power supply to said lamp; and a support at least partially supporting said circuit assembly, said movable element and said magnet.

50. A dimmable lighting device as set forth in claim 49 further comprising a transistor connected to said Hall effect sensor for receiving said sensor output voltage, said transistor connected between said power source and said lamp for responding to said sensor output voltage and delivering at least one second voltage to said lamp.

51. A dimmable lighting device as set forth in claim 49 which further comprises a threaded element connected to one of said magnet and said Hall effect sensor; and said movable element includes a mating thread in said threaded element for establishing said first position and said second position.

52. A dimmable lighting device comprising a circuit assembly including
a light emitting diode connectable to a power source having a voltage for emitting light in response to the application of at least a first voltage from the power source;

an incandescent lamp connectable to the power source for emitting light in response to the application of at least a second voltage from the power source;

a switch and a voltage control including a Hall effect sensor;

a magnet having a magnetic field;

a movable element movably connecting said Hall effect sensor, said switch and said magnet; said movable element having a plurality of positions establishing a plurality of locations relative to said magnet, said Hall effect sensor electrically connected to and energized with the voltage from the power source to respond to said Hall effect sensor intersecting said magnetic field to effect a sensor output voltage and deliver at least said second voltage to said incandescent lamp;

said switch at a first position of said movable element connecting said light emitting diode to said power source and applying at least said first voltage to said light emitting diode; and said Hall effect sensor at a second position of said movable element at a first location relative to said magnet and intersecting a first value of a magnetic flux from said magnetic field to effect a first value of the sensor output voltage and deliver at least said second voltage to said incandescent lamp; and a support at least partially supporting said circuit assembly, said switch, said movable element and said magnet.

53. A dimmable lighting device as set forth in claim 52 comprising said control means has a transistor connected to said Hall effect sensor for receiving said sensor output voltage, said transistor connected between said power source and said lamp for responding to said sensor output voltage and delivering at least said second voltage to said lamp.

54. A dimmable lighting device as set forth in claim 52 which further comprises a threaded element connected to one of said magnet and said Hall effect sensor; and said movable element includes a mating thread in said threaded element for establishing said first position and said second position.

55. In an electrical lighting device, the combination comprising a magnet having a magnetic field;

a lamp for emitting light upon the application of at least a first voltage;

a circuit assembly including said lamp, a Hall effect sensor and a transistor, said sensor being connectable to a power source to be energized by a voltage from said power source to respond to a magnetic flux and effect a sensor output voltage, said transistor connected to said sensor to receive said sensor output voltage therefrom and to deliver said first voltage from said power source to said lamp;

a switch for a selective delivery of a voltage to said lamp from the power source;

a support at least partially supporting the group of said circuit assembly and said magnet with said sensor movably connected to said magnet; and wherein said sensor has a plurality of positions relative to said magnetic field to intersect a plurality of values of magnetic flux in said magnetic field and apply a plurality of values of said sensor output voltage to said transistor whereby upon being disposed at a first location relative to said magnetic field, said sensor responds to a fist value of magnetic flux from said lamp and upon being disposed at a second location relative to said magnetic field, said sensor responds to a second value of magnetic flux by delivering at least a second voltage greater than said first voltage to vary a power supplied to said lamp.

* * * * *

UNITED STATES PATENT AND TRADEMARK OFFICE
CERTIFICATE OF CORRECTION

PATENT NO. : 6,091,238  
DATED : July 18, 2000  
INVENTOR(S) : Damien McDermott

Page 1 of 1

It is certified that error appears in the above-identified patent and that said Letters Patent is hereby corrected as shown below:

Column 10,  
Line 16, after "switch" insert -- with the use of a movable element --  
Line 43, after "switch" insert -- with the use of a movable element --  
Line 50, after "adjustment means" insert -- for movement of a movable element --; and cancel "said".  
Line 51, after "movement" insert -- for --  
Line 67, after "switch" insert -- with the use of a movable element --

Column 11,  
Line 32, after "switch" insert -- for a movement of a movable element --  
Line 57, after "sensor means" insert --, --  
Line 58, after "switch" insert --with the use of a movable element --

Column 12,  
Line 15, change "and said" to -- , said --  
Line 16, after "switch" insert -- with the use of a movable element--

Column 18,  
Line 53, change "fist" to -- first--

Signed and Sealed this

Fifth Day of February, 2002

Attest:

Attesting Officer

JAMES E. ROGAN  
Director of the United States Patent and Trademark Office